(12) United States Patent
Underwood et al.

(10) Patent No.: US 12,459,662 B2
(45) Date of Patent: Nov. 4, 2025

(54) ENHANCED VEHICLE FUEL QUANTITY INDICATION SYSTEM

(71) Applicant: Rockwell Collins, Inc., Cedar Rapids, IA (US)

(72) Inventors: Darin M. Underwood, Cedar Rapids, IA (US); D. Mark Fejfar, North Liberty, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 301 days.

(21) Appl. No.: 18/139,675

(22) Filed: Apr. 26, 2023

(65) Prior Publication Data

US 2024/0359807 A1 Oct. 31, 2024

(51) Int. Cl.
| | | |
|---|---|---|
| *B64D 37/00* | (2006.01) | |
| *G01F 23/18* | (2006.01) | |
| *G01N 9/04* | (2006.01) | |
| *G06N 3/02* | (2006.01) | |

(52) U.S. Cl.
CPC ........... *B64D 37/005* (2013.01); *G01F 23/18* (2013.01); *G06N 3/02* (2013.01); *G01N 9/04* (2013.01)

(58) Field of Classification Search
CPC ...... B64D 37/005; B64D 37/00; B64D 45/00; G01N 9/04; G01N 9/24; G01F 25/0084; G01F 23/14; G01F 23/18; G01F 23/804; G01F 1/00; G06N 3/02
See application file for complete search history.

(56) References Cited

U.S. PATENT DOCUMENTS

| | | | |
|---|---|---|---|
| 3,579,218 A | | 5/1971 | Forsythe, Jr. |
| 6,098,012 A | * | 8/2000 | Stander ................ G05B 13/027 |
| | | | 123/406.47 |
| 6,157,894 A | * | 12/2000 | Hess ....................... G01F 23/18 |
| | | | 702/50 |
| 10,556,703 B1 | | 2/2020 | Skola |
| 10,564,022 B2 | | 2/2020 | Olson |

(Continued)

FOREIGN PATENT DOCUMENTS

| | | |
|---|---|---|
| CN | 106768123 A | 5/2017 |
| GB | 1986010381 | 6/1986 |

(Continued)

OTHER PUBLICATIONS

European Patent Office, Extended European Search Report received in EP Application No. 24171460.9, Sep. 24, 2024, 8 pages.

*Primary Examiner* — Kristina M Deherrera
*Assistant Examiner* — Gedeon M Kidanu
(74) *Attorney, Agent, or Firm* — Suiter Swantz IP

(57) ABSTRACT

A fuel quantity indicator system (FQIS) for an aircraft or other vehicle includes memory/data storage and a fuel quantity processing unit (FQPU). A neural network trained via machine learning and running on the FQPU receives fuel quantity (FQ) inputs from fuel tank sensors, e.g., tank density, fuel volume, water presence within the tank, at or near a given measurement time. The neural network additionally receives fuel flow (FF) inputs from flow sensors at the measurement time, indicating fuel flow to engines and auxiliary power units (APU) of the vehicle. Based on the FQ inputs and the FF inputs, the neural network calculates an estimated fuel quantity (EFQ) remaining, e.g., across all fuel tanks at or near a particular measurement time.

15 Claims, 6 Drawing Sheets

(56) References Cited

U.S. PATENT DOCUMENTS

| | | | |
|---|---|---|---|
| 10,648,846 | B2 | 5/2020 | Carralero et al. |
| 10,670,442 | B2 | 6/2020 | Quartarone et al. |
| 10,807,702 | B2 | 10/2020 | Baron et al. |
| 10,935,413 | B2 | 3/2021 | Chan et al. |
| 11,174,036 | B2 | 11/2021 | Carralero et al. |
| 2008/0272237 | A1 | 11/2008 | Tichborne et al. |
| 2018/0299315 | A1 | 10/2018 | Crowne et al. |
| 2019/0003870 | A1* | 1/2019 | Quartarone .......... B64D 37/005 |
| 2020/0326224 | A1 | 10/2020 | Chan et al. |
| 2021/0292009 | A1 | 9/2021 | Mangat et al. |
| 2022/0120599 | A1 | 4/2022 | Galati et al. |
| 2022/0391721 | A1* | 12/2022 | Apte ................... A01M 7/0089 |

FOREIGN PATENT DOCUMENTS

| | | |
|---|---|---|
| KR | 1020020043884 A | 6/2002 |
| KR | 1020190115596 A | 10/2019 |

\* cited by examiner

ENHANCED VEHICLE FUEL QUANTITY INDICATION SYSTEM

BACKGROUND

Conventional systems for indicating aircraft fuel quantity calculate a fuel quantity remaining, and a weight of said fuel quantity, based on fuel volume measured within fuel tanks. With respect to legacy aircraft, the fuel quantity and/or fuel weight is displayed to the flight crew with an accepted level of error averaging 1 to 3 percent. Assuming, for example, 10,000 gallons of fuel are required for a particular flight segment, the margin for error would be equivalent to between 100 and 300 gallons. At 6.75 lbs per gallon, this works out to between 675 and 2,025 lbs of unnecessary weight the aircraft must carry. Obviously this is not environmentally friendly, but hundreds or thousands of pounds of potentially unnecessary fuel load also translates to an equivalent number of passengers and/or amount of cargo the aircraft is unable to carry.

SUMMARY

In a first aspect, a fuel quantity indicator system (FQIS) for an aircraft or other vehicle is disclosed. In embodiments, the FQIS includes memory/data storage and a fuel quantity processing unit (FQPU). A neural network trained via machine learning and running on the FQPU receives fuel quantity (FQ) inputs from fuel tank sensors, e.g., tank density, fuel volume, water presence within the tank, at or near a given measurement time. The neural network additionally receives fuel flow (FF) inputs from flow sensors at the measurement time, indicating fuel flow to engines and auxiliary power units (APU) of the vehicle. Based on the FQ inputs and the FF inputs, the neural network calculates an estimated fuel quantity (EFQ) remaining, e.g., across all fuel tanks at that measurement time.

In some embodiments, the FQ sensors include: tank sensors wirelessly reporting fluid volume within a fuel tank or compartment thereof; densitometers reporting fluid density within a tank or compartment; and/or water detectors indicating the presence of water above a threshold level within a tank or compartment.

In some embodiments, the FQ sensors including fluid pressure gauge sensors, temperature sensors, and/or water detectors optically connected to the FQIS.

In some embodiments, the vehicle is an aircraft, and the measurement time is based on a point along a flight plan executed by the aircraft. For example, the neural network constructs a fuel consumption curve corresponding to the flight plan by assembling a sequence of EFQ outputs corresponding to a series of consecutive measurement times.

In some embodiments, the memory stores benchmark fuel consumption curves to which the current fuel consumption curve may be compared. For example, the neuiral network can compare a calculated EFQ at a particular point on a curve to a corresponding point on a benchmark curve, or a portion of the current curve to a corresponding portion of a benchmark curve. If the current point or portion sufficiently deviates from benchmark fuel consumption performance, the neural network generates a fuel consumption alert.

In some embodiments, the benchmark fuel consumption curves are based on the same aircraft or vehicle (e.g., and indicative of optimal or typical fuel consumption performance by that aircraft or vehicle).

In some embodiments, the aircraft or vehicle is of a particular type, model, engine configuration, and/or fuel tank configuration, and benchmark fuel consumption curves are indicative of fuel consumption performance by that type, model, and/or configuration of aircraft or vehicle.

In some embodiments, the neural network receives flight plan parameters from a flight management system (FMS) of the aircraft. Any deviations of current fuel consumption from benchmark curves are mapped to corresponding flight plan parameters, e.g., occurring at or near the measurement time.

In some embodiments, flight plan parameters correspond to, and fuel consumption deviations are mapped to, a particular flight segment, e.g., taxi, takeoff, climb, cruise, descent, landing.

In a further aspect, a vehicle-based method for fuel quantity monitoring is also disclosed. In embodiments, the method includes receiving, via a neural network running on a fuel quantity indicator system (FQIS) or an aircraft or vehicle, fuel quantity (FQ) input sensed at a measurement time by FQ sensors within a fuel tank (or compartment thereof) of the vehicle. The method includes receiving, via the neural network, fuel flow (FF) input sensed at the measurement time by FF sensors associated with an engine or auxiliary power unit (APU) of the vehicle. The method includes calculating, via the neural network, an estimated fuel quantity (EFQ) across all fuel tanks of the vehicle at the measurement time, based on the FF and FQ input.

In some embodiments, the method includes receiving FQ inputs including a fuel temperature, a fuel pressure, a fuel density, a fuel volume, and/or a threshold presence of water within a tank or compartment.

In some embodiments, the vehicle is an aircraft executing a flight plan, and the method includes adding the calculated EFQ to a current fuel consumption curve corresponding to the current flight plan.

In some embodiments, the method includes comparing the calculated EFQ, the current fuel consumption curve, or a portion of the curve to a benchmark fuel consumption curve. The method includes detecting deviation beyond a threshold amount of the EFQ or current fuel consumption curve from comparable benchmark fuel consumption. The method includes generating a fuel consumption alert when sufficient deviation is detected.

In some embodiments, the benchmark fuel consumption curves correspond to the specific aircraft or vehicle.

In some embodiments, the benchmark fuel consumption curves correspond to a model designation, engine configuration, and/or fuel tank configuration corresponding to the aircraft or vehicle (e.g., indicative of average, optimal, etc. fuel consumption performance by that type or model of aircraft).

In some embodiments, the method includes receiving flight plan parameters from an onboard flight management system (FMS), the flight plan parameters concurrent with the measurement time. The method includes mapping any fuel consumption deviations at a measurement time to concurrent flight plan parameters.

In some embodiments, the flight plan parameters include specific flight segments within which the measurement time occurs, e.g., taxi, takeoff, climb, cruise, descent, or landing.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
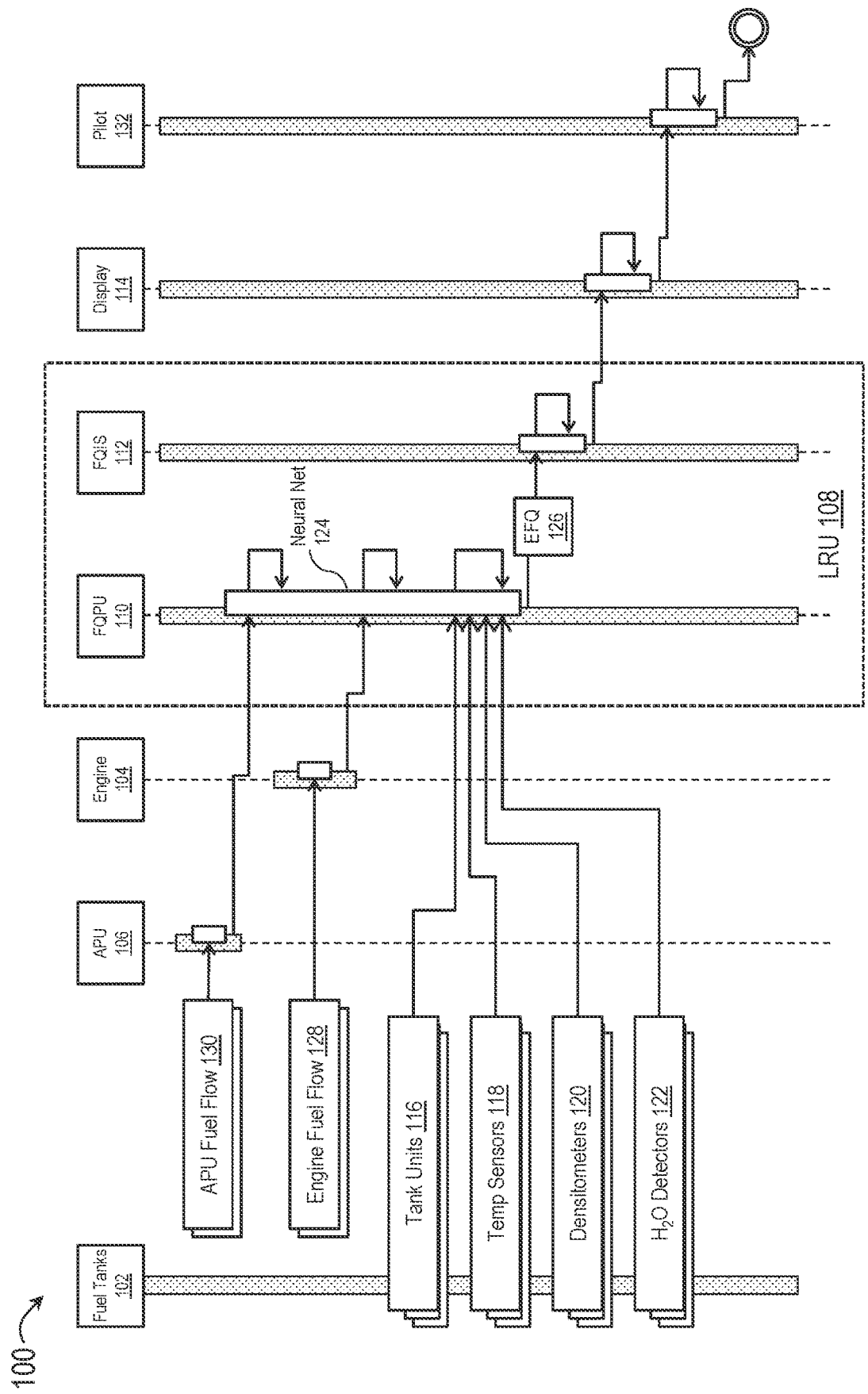
FIG. 1 is a block diagram illustrating a fuel quantity indicator system (FQIS) according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to systems and methods for calculating total fuel quantity aboard an aircraft or other vehicle via neural networks trained by machine learning algorithms to determine fuel quantity based on additional fuel flow parameters with significantly increased accuracy. For example, an enhanced fuel quantity indicator system (FQIS) may calculate and monitor fuel quantity to a margin of error under 1 percent, reducing the required onboard fuel weight by several tons per flight segment. In addition to enabling sustainability by reducing fuel requirements, weight dedicated to excess fuel may be reclaimed for additional passengers and/or payload. Further, the enhanced FQIS may monitor fuel quantity and fuel consumption throughout a flight segment or flight plan, alerting and/or investigating any significant deviations from nominal fuel consumption patterns.

Referring to FIG. 1, a vehicle 100 is shown. The vehicle 100 may be an aircraft or any appropriate ground-based or water-based vehicle. The vehicle 100 may include fuel tanks 102, engines 104, auxiliary power units 106, line replaceable unit 108 (LRU) including fuel quantity processor unit 110 (FQPU) and fuel quantity indicator system 112 (FQIS), and display unit 114.

In embodiments, the vehicle 100 may incorporate multiple fuel tanks 102 at various locations. For example, an aircraft may include fuel tanks 102 within its left and right wings, and/or additional tanks centrally located within its fuselage. Each fuel tank 102 may include one or more tank units 116 for measuring fuel volume within the tank or within a compartment or subdivision thereof (e.g., ultrasonically or otherwise wirelessly connected to, and in communication with, the FQPU 110). Further, each fuel tank 102 may include one or more temperature sensors 118 for reporting fuel temperature (e.g., which may affect fuel density and mass). Further, each fuel tank 102 may include one or more densitometers 120 for reporting real-time fuel density within the tank or compartment. Further, each fuel tank 102 may include one or more water detectors 122. For example, each water detector 122 may report the presence of water at or greater than a threshold level within the tank or a compartment thereof (which may result in, e.g., ice formation at altitude, fuel spoilage, and/or filter blockage). In embodiments, the FQPU 110 may receive fuel quantity (FQ) parameters reported by the tank units, temperature sensors 118, densitometers 120, and/or water detectors 122.

In embodiments, the FQPU 110 may include one or more processors (e.g., physical processors, virtual partitions of a multi-core processors) configured for execution of a neural network 124. For example, the neural network 124 may receive (e.g., in addition to FQ parameters received by the FQPU 110 as noted above) fuel flow (FF) parameters and, based on the FQ and FF parameters, calculate an estimated fuel quantity 126 (EFQ). In embodiments, the vehicle 100 may include fuel flow sensors within, or proximate to, each engine 104 (e.g., engine fuel flow sensors 128) and APU 106 (e.g., APU fuel flow sensors 130). For example, the APU 106 may consume fuel similarly to the engines 104, but may provide power (e.g., AC and/or DC voltage) for vehicular electrical systems and/or other non-propulsion functions and purposes.

In embodiments, the neural network 124 may receive sets of FQ parameters and FF parameters associated with a measurement time and representative of a total fuel quantity at said measurement time. For example, the neural network 124 may be trained by machine learning algorithms to balance conventional FQ parameters with fuel flow information (e.g., as reflected in the received FF parameters) to assess actual fuel consumption by the engines 104 and/or APU 106 and thereby more accurately report the EFQ 126. In embodiments, the FQIS 112 may forward the calculated EFQ 126 to a display unit 114 for display to the pilot 132 and/or flight crew.

Figure 2:
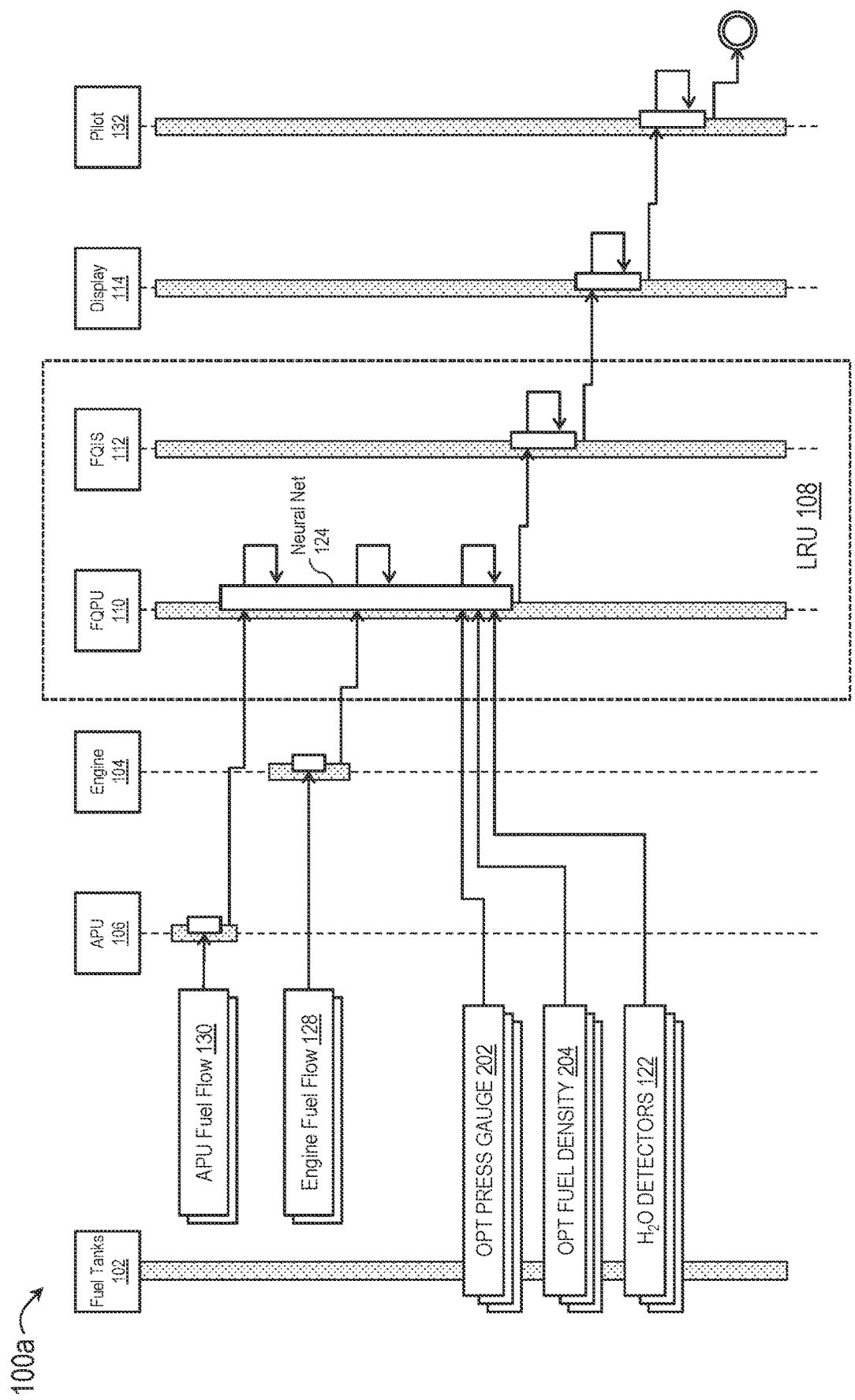
FIG. 2 is a block diagram illustrating an aircraft incorporating the FQIS of FIG. 1.

Referring now to FIG. 2, the vehicle 100*a* may be implemented and may function similarly to the vehicle 100 of FIG. 1, except that the vehicle 100*a* may incorporate a next-generation fuel gauging architecture wherein, in addition to water detectors 122, FQ parameters are provided to the FQPU 110 by optical fuel pressure gauges 202 and optical fuel density sensors 204, e.g., connected to the FQPU 110 via fiber optic link or any appropriate like optical medium.

Figure 3:
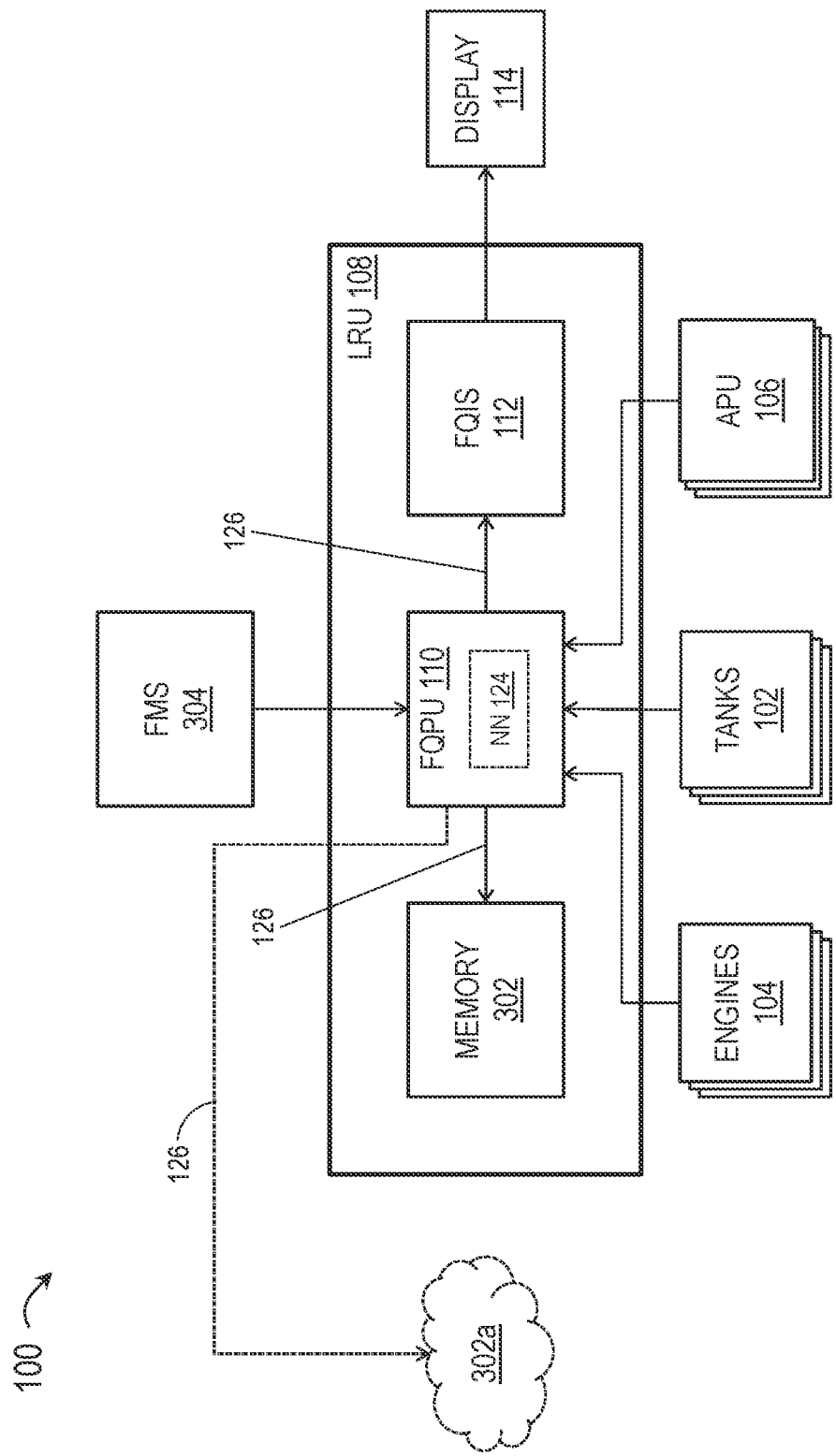
FIG. 3 is a block diagram illustrating a line replaceable unit (LRU) incorporating the FQIS of FIG. 1.
Figure 4:
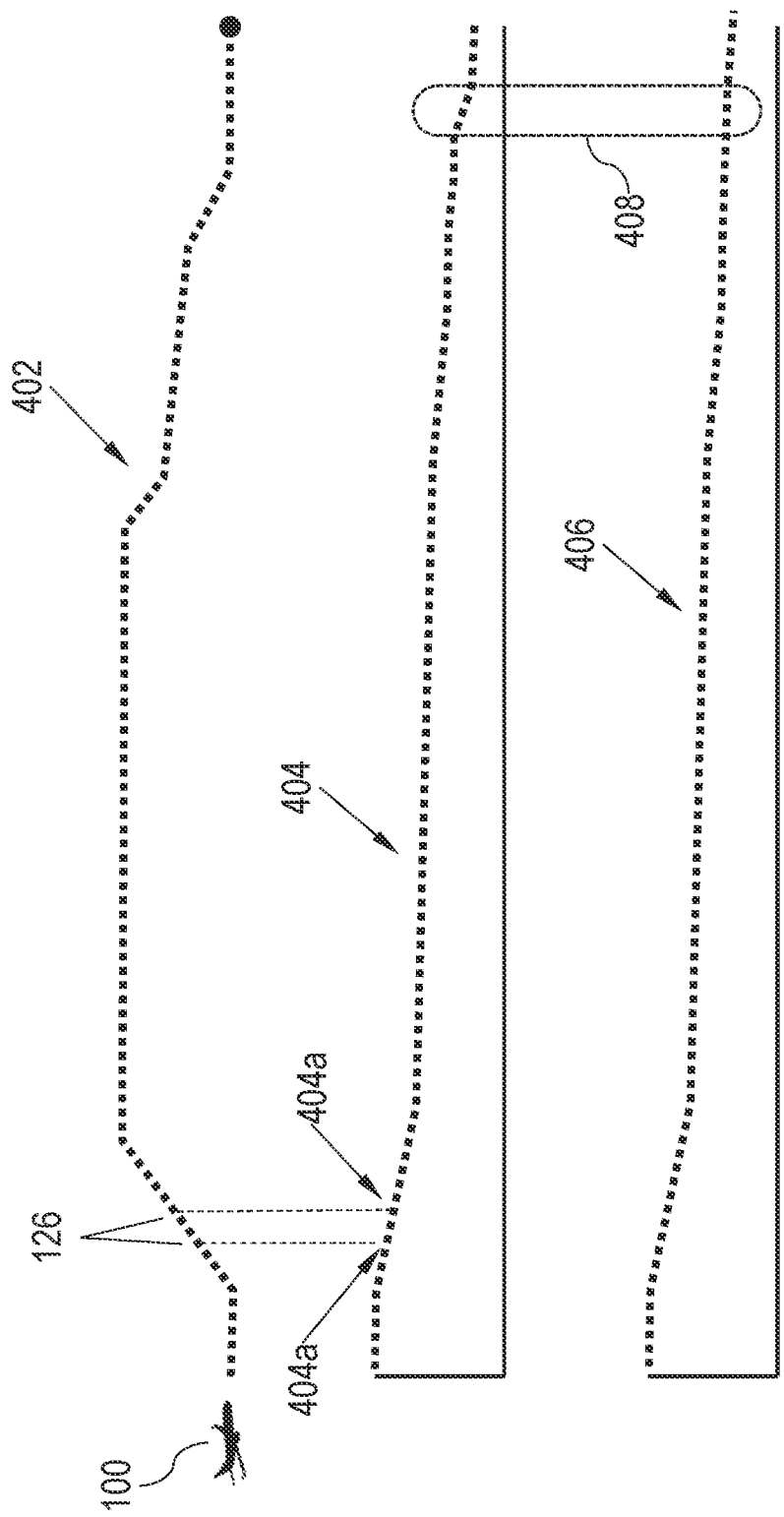
FIG. 4 is a diagrammatic illustration of fuel consumption curves tracked by the FQIS of FIG. 1.

Referring now to FIGS. 3 and 4, the aircraft 100 is shown.

In embodiments, referring in particular to FIG. 3, the LRU 108 may include a memory 302 or like data storage for, e.g., encoded instructions executable by the FQPU 110, estimated fuel quantity 126 outputs generated by the FQPU, and/or benchmark fuel consumption data associated with the aircraft 100. For example, in aircraft-based embodiments of the LRU 108, the neural network 124 may be trained for operations aboard a broad variety of aircraft makes, models, and/or configurations. Different aircraft models (e.g., twin-engine, tri-engine, quad-engine) may incorporate different types, placements, and/or configurations of engines 104, APUs 106, and/or fuel tanks 102. Similarly, within general aircraft configurations (e.g., dual-engine), different makes and models of aircraft 100 incorporating different components (e.g., A320ceo vs. A320neo vs. 737NG vs. 737MAX) may perform differently, and may consume fuel differently, given a particular flight segment (e.g., assuming consistent weather/atmospheric conditions).

In embodiments, referring also to FIG. 4, the neural network 124 may generate an EFQ 126 for each measurement time, providing each generated EFQ to the FQIS 112 (e.g., for forwarding to the display 114) and saving each EFQ to memory 302, such that as the aircraft 100 executes its current flight plan 402 (e.g., from gate departure to initial taxi to takeoff to initial climb to level flight at cruising altitude to descent to landing to final taxi to gate arrival and shutdown), the neural network constructs a current fuel consumption curve 404 (e.g., fuel consumption profile) tracking the consumption of fuel by the aircraft, and/or the amount of fuel remaining, over time as the flight plan progresses. For example, each generated EFQ 126 associated with a measurement time may correspond to a point 404*a* of the current fuel consumption curve. Similarly, the current fuel consumption curve 404 may comprise, and points 404*a* thereof may correspond to one of, a sequence of consecutive flight segments (e.g., taxi segment, takeoff segment, climb segment, cruise segment, descent segment, landing segment), such that portions of the current fuel consumption curve may track fuel consumption, and/or may be compared to benchmark performance for, a particular flight segment or set thereof.

In some embodiments, the memory 302 may store additional benchmark fuel consumption data 406, such that the neural network 124 may analyze the current fuel consumption curve 404 in real time against other comparable fuel consumption curves to detect and/or investigate deviant fuel consumption patterns or trends associated with the aircraft 100. For example, benchmark fuel consumption data 406 may include prior flights by other aircraft of the same model and/or engine/APU configuration as the aircraft 100 along the current flight plan 402. In some embodiments, benchmark fuel consumption data 406 may include prior fuel consumption curves generated during prior flights by the same aircraft 100 along the same current flight plan 408.

In embodiments, the neural network 124 may set thresholds for one or more segments of the current flight plan 402 such that, should one or more EFQ points (404*a*) of the current fuel consumption curve 404 deviate (408) from benchmark fuel consumption data 406 to at least the associated threshold amount, the FQIS 112 may generate an alert for display (via the display 114) to the pilot (132, FIG. 1) and/or flight crew. Further, the FQPU 110 may cross-reference any deviation of the current fuel consumption curve 404 with flight plan data received from an onboard flight management system (FMS; 304, FIG. 3), which may also be displayed via the display 114 and/or stored to memory 302 for subsequent analysis. For example, the current fuel consumption curve 404 may deviate from benchmark fuel consumption trends 406 for other aircraft of like model and engine/APU configuration, but may remain consistent with fuel consumption norms for that aircraft. If, however, the current fuel consumption curve 404 deviates significantly (408) from benchmark fuel consumption performance (406) specific to the aircraft 100, cross-referenced flight plan data from the onboard FMS 304 may provide additional insight as to other factors (e.g., aircraft performance issues, component or system faults, adverse weather and atmospheric conditions) contributing to anomalous or deviant fuel consumption patterns on the part of the aircraft.

In some embodiments, the FQPU 110 may incorporate cloud-based memory (302*a*, FIG. 3) or like data storage not physically housed within the LRU 108.

Figure 5A:
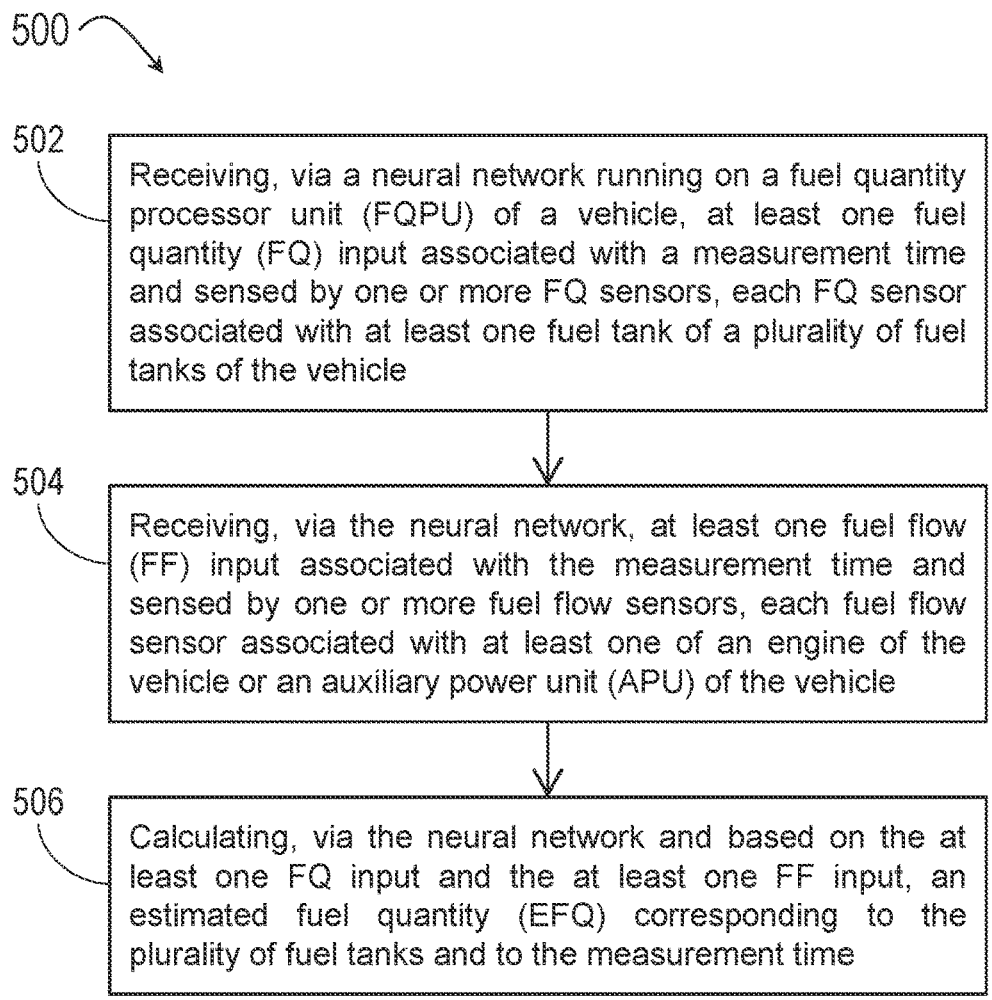
FIGS. 5A through 5D are flow diagrams illustrating a vehicle-based method for fuel quantity monitoring according to example embodiments of this disclosure.

Referring now to FIG. 5A, the method 500 may be implemented by the vehicle-based LRU 108 and may include the following steps.

At a step 502, a neural network running on a fuel quantity processor unit (FQPU) of the LRU receives fuel quantity (FQ) inputs sensed at or around a measurement time by fuel tank-based FQ sensors.

At a step 504, the neural network receives fuel flow (FF) inputs sensed at or around the measurement time by fuel flow sensors associated with engines or auxiliary power units (APUs) of the vehicle.

At a step 506, the neural network calculated an estimated fuel quantity (EFQ) associated with the measurement time and based on the received FQ and FF inputs, the EFQ based on an estimated total fuel quantity remaining across all fuel tanks of the vehicle.

Figure 5B:
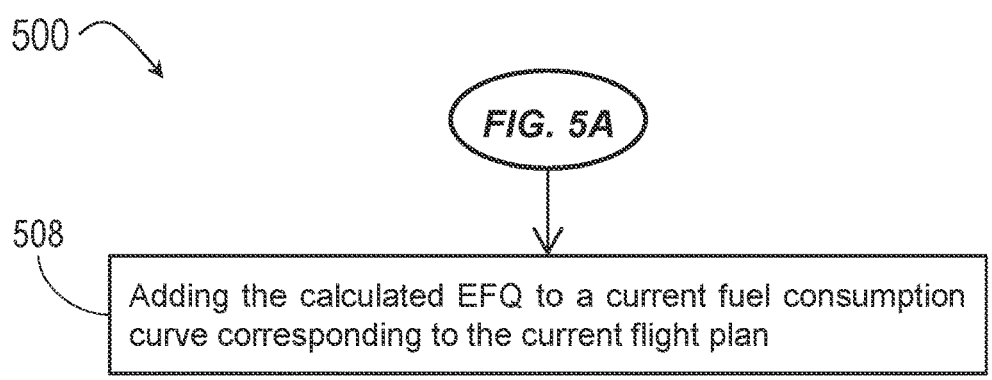

Referring also to FIG. 5B, the method 500 may include an additional step 508. At the step 508, the FQPU adds the generated EFQ to a current fuel consumption curve corresponding to a flight plan or trip currently under execution by the vehicle.

Figure 5C:
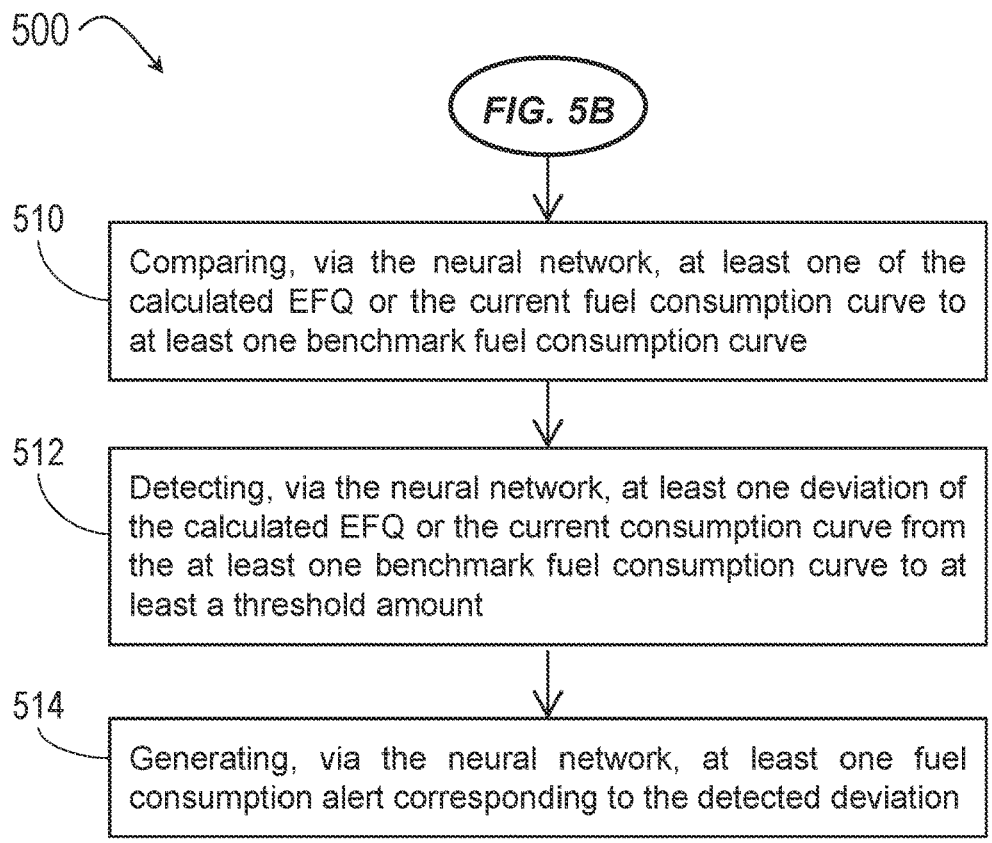

Referring also to FIG. 5C, the method 500 may include additional steps 510 through 514. At the step 510, the neural network compares the generated EFQ and/or the current fuel consumption curve to benchmark fuel consumption data (e.g., for this model of vehicle, for this engine configuration, for this specific vehicle).

At a step 512, the neural network identifies points or regions where the current fuel consumption curve deviates from comparable benchmark fuel consumption curves to at least a threshold level.

At the step 514, the neural network and/or FGPU generates an alert for the pilot, flight crew, or vehicle operator based on the detected deviation.

Figure 5D:
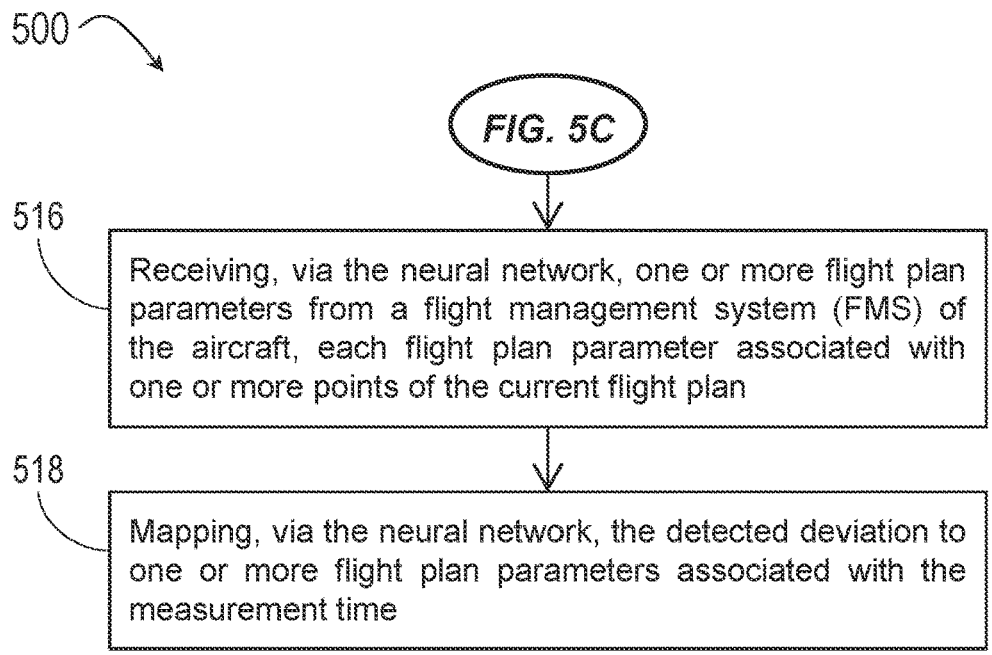

Referring also to FIG. 5D, the method 500 may include additional steps 516 and 518. At the step 516, the neural network receives flight plan parameters from an aircraft-based flight management system (FMS), e.g., aircraft performance data, weather conditions, and/or other factors relevant to a particular measurement time corresponding to a generated EFQ.

At the step 518, the neural network maps a detected deviation of the current EFQ and/or fuel consumption curve to flight plan parameters corresponding to the measurement times of the deviant EFQ or curve region. For example, corresponding flight plan parameters may be stored to memory with the deviant EFQ or portion of the current fuel consumption curve for subsequent analysis, or displayed to the pilot or flight crew.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A fuel quantity indicator system (FQIS) for an aircraft, comprising:
   a memory configured for storing processor-executable encoded instructions;
   a fuel quantity processing unit (FQPU) comprising one or more processors communicatively coupled with the memory and configurable by the encoded instructions;
   at least one neural network configured for execution on the FQPU and trained via one or more machine learning algorithms to:
      receive one or more fuel quantity (FQ) inputs from at least one FQ sensor associated with a fuel tank of a plurality of fuel tanks of the aircraft and with a measurement time corresponding to at least one point along a current flight plan under execution by the aircraft, the one or more FQ inputs comprising at least one of:
      a tank density;
      a fuel volume;
      or
      a tank water content;
      receive one or more fuel flow (FF) inputs from at least one fuel flow sensor associated with the aircraft and with the measurement time, each fuel flow sensor corresponding to at least one of:
      an engine of the aircraft;
      or
      an auxiliary power unit (APU) of the aircraft;
      based on the one or more FQ inputs and the one or more FF inputs, calculate an estimated fuel quantity (EFQ) corresponding to the plurality of fuel tanks and to the measurement time;
      and
      add the calculated EFQ to a current fuel consumption curve corresponding to the current flight plan.

2. The FQIS of claim 1, wherein the one or more FQ sensors include at least one of:
   a tank sensor configured to report a fluid volume within a fuel tank of the plurality of fuel tanks, the tank sensor wirelessly connected to the FQIS;
   a temperature sensor configured to report a fluid temperature;
   a densitometer configured to report a fluid density;
   or
   a water detector configured to report a presence of water within the fuel tank.

3. The FQIS of claim 1, wherein the one or more FQ sensors include at least one of:
   a pressure gauge sensor configured to report a fluid pressure within a fuel tank of the plurality of fuel tanks, the pressure gauge sensor optically coupled to the FQIS;
   a temperature sensor configured to report a fluid temperature;
   or
   a water detector configured to report a presence of water within the fuel tank.

4. The FQIS of claim 1, wherein:
   the memory is configured to store one or more benchmark fuel consumption curves;
   and wherein the at least one neural network is configured to:
      compare at least one of the calculated EFQ or the current fuel consumption curve;
      and
      generate at least one fuel consumption alert corresponding to a deviation of the calculated EFQ or the current fuel consumption curve from the one or more benchmark fuel consumption curves to at least a threshold amount.

5. The FQIS of claim 4, wherein the one or more benchmark fuel consumption curves correspond to the aircraft.

6. The FQIS of claim 4, wherein:
   the aircraft is associated with one or more of a model designation, an engine configuration, or a fuel tank configuration;
   and
   wherein the one or more benchmark fuel consumption curves correspond to the model designation, engine configuration, or fuel tank configuration.

7. The FQIS of claim 4, wherein the at least one neural network is configured to:
receive one or more flight plan parameters from at least one flight management system (FMS) communicatively coupled to the FQIS, each flight plan parameter associated with the current flight plan;
and
map each deviation to one or more flight plan parameters associated with the measurement time.

8. The FQIS of claim 7, wherein the one or more flight plan parameters include at least one flight segment selected from a group including a taxi segment, a takeoff segment, a climb segment, a cruise segment, a descent segment, or a landing segment.

9. An aircraft-based method for fuel quantity monitoring, the method comprising:
receiving, via a neural network running on a fuel quantity processor unit (FQPU) of an aircraft, at least one fuel quantity (FQ) input associated with a measurement time corresponding to at least one point along a current flight plan under execution by the aircraft, the at least one FQ input sensed by one or more FQ sensors, each FQ sensor associated with at least one fuel tank of a plurality of fuel tanks of the aircraft;
receiving, via the neural network, at least one fuel flow (FF) input associated with the measurement time and sensed by one or more fuel flow sensors, each fuel flow sensor associated with at least one of an engine of the aircraft or an auxiliary power unit (APU) of the aircraft;
calculating, via the neural network and based on the at least one FQ input and the at least one FF input, an estimated fuel quantity (EFQ) corresponding to the plurality of fuel tanks and to the measurement time;
and
adding the calculated EFQ to a current fuel consumption curve corresponding to the current flight plan.

10. The method of claim 9, wherein receiving at least one fuel quantity (FQ) input associated with a measurement time and sensed by one or more FQ sensors includes receiving at least one of:
a fuel temperature;
a fuel pressure;
a fuel density;
a fuel volume;
or
a presence of water within the fuel tank.

11. The method of claim 10, further comprising:
comparing, via the neural network, at least one of the calculated EFQ or the current fuel consumption curve to at least one benchmark fuel consumption curve;
detecting, via the neural network, at least one deviation of the calculated EFQ or the current consumption curve from the at least one benchmark fuel consumption curve to at least a threshold amount;
and
generating, via the neural network, at least one fuel consumption alert corresponding to the detected deviation.

12. The method of claim 11, wherein the one or more benchmark fuel consumption curves correspond to the aircraft.

13. The method of claim 11, wherein:
the aircraft is associated with one or more of a model designation, an engine configuration, or a fuel tank configuration;
and
wherein the one or more benchmark fuel consumption curves correspond to the model designation, engine configuration, or fuel tank configuration.

14. The method of claim 11, further comprising
receiving, via the neural network, one or more flight plan parameters from a flight management system (FMS) of the aircraft, each flight plan parameter associated with one or more points of the current flight plan;
and
mapping, via the neural network, the detected deviation to one or more flight plan parameters associated with the measurement time.

15. The method of claim 14, wherein receiving, via the neural network, one or more flight plan parameters from a flight management system (FMS) of the aircraft includes:
receiving from the FMS at least one flight segment selected from a group including selected from a group including a taxi segment, a takeoff segment, a climb segment, a cruise segment, a descent segment, or a landing segment.

\* \* \* \* \*